US007384366B2

United States Patent
Kelley, Jr.

(10) Patent No.: US 7,384,366 B2
(45) Date of Patent: Jun. 10, 2008

(54) TRANSFER CASE WITH TORQUE SYNCHRONIZER CLUTCHING

(75) Inventor: William R. Kelley, Jr., Novi, MI (US)

(73) Assignee: BorgWarner Inc., Auburn Hills, MI (US)

( * ) Notice: Subject to any disclaimer, the term of this patent is extended or adjusted under 35 U.S.C. 154(b) by 212 days.

(21) Appl. No.: 11/077,616

(22) Filed: Mar. 11, 2005

(65) Prior Publication Data

US 2005/0202920 A1  Sep. 15, 2005

Related U.S. Application Data

(60) Provisional application No. 60/552,558, filed on Mar. 12, 2004.

(51) Int. Cl.
*F16H 3/44* (2006.01)

(52) U.S. Cl. ............ 475/296; 475/198; 475/295; 475/303; 192/53.2; 192/53.32; 192/84.6; 180/248

(58) Field of Classification Search ........... 475/198, 475/295, 296, 303; 192/53.31, 53.32, 53.2, 192/84.6; 180/247, 248
See application file for complete search history.

(56) References Cited

U.S. PATENT DOCUMENTS

| | | | |
|---|---|---|---|
| 2,547,732 A * | 4/1951 | Baker ............ 192/53.4 |
| 2,930,462 A | 3/1960 | Willis | |
| 2,993,579 A | 7/1961 | Altmann | |
| 3,931,874 A | 1/1976 | Braun et al. | |
| 4,289,223 A | 9/1981 | Strehler et al. | |
| 4,348,913 A | 9/1982 | Nozawa | |
| 4,462,271 A * | 7/1984 | Stieg ............ 475/86 |
| 4,576,264 A * | 3/1986 | Lupo et al. ........ 192/48.91 |
| 4,809,832 A | 3/1989 | Inui | |
| 4,817,772 A * | 4/1989 | Sacher ............ 192/48.91 |
| 5,031,746 A | 7/1991 | Koivunen | |
| 5,178,250 A | 1/1993 | Ashikawa et al. | |
| 5,409,429 A * | 4/1995 | Showalter et al. ...... 475/295 |
| 5,443,429 A | 8/1995 | Baxter, Jr. | |
| 5,522,777 A | 6/1996 | Baxter et al. | |
| 5,528,950 A | 6/1996 | Organek et al. | |
| 5,588,516 A | 12/1996 | Braun et al. | |
| 5,638,933 A | 6/1997 | Matsumoto et al. | |
| 5,700,222 A | 12/1997 | Bowen | |
| 5,803,218 A | 9/1998 | Perosky et al. | |
| 5,810,141 A | 9/1998 | Organek et al. | |
| 5,853,342 A | 12/1998 | Pritchard et al. | |
| 5,888,165 A | 3/1999 | Besler et al. | |

(Continued)

*Primary Examiner*—David D. Le
(74) *Attorney, Agent, or Firm*—Warn Partners, P.C.

(57) ABSTRACT

The transfer case reduction gearset is often never used for its original intended function, that is, to provide an additional speed reduction (torque amplification) ratio for the powertrain. This concept allows for the increased use of the transfer case gearset components to work in concert with the automatic transmission to increase its ratio spread. This increase in ratio spread will result in improved launch performance for the vehicle by steepening the effective first gear ratio of the automatic transmission. The increase in ratio spread may also provide for reductions in numerical axle ratio of the vehicle thereby improving the fuel economy during normal highway operation. The present invention focuses on a method of shifting the transmission of the vehicle in accordance with the invention which includes providing a transmission connected to a vehicle engine having a predetermined number of gear ratios which are selectable.

27 Claims, 7 Drawing Sheets

U.S. PATENT DOCUMENTS

| | | |
|---|---|---|
| 5,921,362 A | 7/1999 | Bailly et al. |
| 5,953,959 A | 9/1999 | Organek et al. |
| 5,954,612 A | 9/1999 | Baxter, Jr. |
| 5,975,263 A | 11/1999 | Forsyth |
| 6,039,160 A | 3/2000 | Joppeck |
| 6,101,897 A | 8/2000 | Showalter |
| 6,105,702 A | 8/2000 | Showalter |
| 6,165,103 A | 12/2000 | Tenzor et al. |
| 6,193,629 B1 | 2/2001 | Tenzor et al. |
| 6,203,465 B1 | 3/2001 | Showalter |
| 6,230,577 B1 | 5/2001 | Showalter et al. |
| 6,231,470 B1 | 5/2001 | Cook et al. |
| 6,286,379 B1 | 9/2001 | Yester et al. |
| 6,514,167 B1 | 2/2003 | Fleytman et al. |
| 6,572,506 B2 | 6/2003 | Williams et al. |
| 6,575,867 B1 | 6/2003 | Stephens et al. |
| 6,631,779 B2 | 10/2003 | Watson et al. |
| 2003/0094343 A1 | 5/2003 | Showalter |
| 2003/0221927 A1 | 12/2003 | Showalter et al. |
| 2004/0198548 A1* | 10/2004 | Showalter et al. .......... 475/303 |
| 2004/0220009 A1* | 11/2004 | Yu et al. .................... 475/198 |

* cited by examiner

TRANSFER CASE WITH TORQUE SYNCHRONIZER CLUTCHING

CROSS-REFERENCE TO RELATED APPLICATIONS

This application claims the benefit of U.S. Provisional Application No. 60/552,588, filed Mar. 12, 2004. The disclosure of the above application is incorporated herein by reference.

FIELD OF THE INVENTION

The present invention relates to improving the powertrain of a vehicle by providing additional speed reduction ratios.

BACKGROUND OF THE INVENTION

Transfer cases are a common method of transferring power to more than one set of wheels in a motor vehicle. Devices such as transfer cases often have the ability to operate at more than one gear ratio. Typically a 1:1 gear ratio is used, and less often a reduced gear ratio, which can range from 1.5:1 to 4:1, is also used to generate more torque. For the transfer case to provide a transfer of power to more than one set of wheels in the vehicle, it is common practice for various types of synchronizers to be used to engage the gears in the transfer case providing the different gear ratios. These synchronizers can provide a smooth power transition with minimal effort.

Because typical driving conditions do not mandate the use of the reduced speed, high-torque gearset in the transfer case, most owners of vehicle equipped with four-wheel-drive do not ever use this function of the transfer case.

SUMMARY OF THE INVENTION

The transfer case reduction gearset is often never used for its original intended function, that is, to provide an additional speed reduction (torque amplification) ratio for the powertrain. This concept allows for the increased use of the transfer case gearset components to work in concert with the automatic transmission to increase its ratio spread. This increase in ratio spread will result in improved launch performance for the vehicle by steepening the effective first gear ratio of the automatic transmission, and will also allow for the vehicle to operate at a lower speed with the engine in a normal speed range. When the vehicle is traveling on a steep, downhill grade, there is a significant risk of overheating the brakes while trying to maintain a slow, safe speed without the assistance of a low range gear. The elevated ratio of engine speed to ground speed allows the engine compression to aid in the braking of the vehicle.

The use of low range extends the life of the transmission because it allows the transmission to operate in its higher gears, as opposed to the lower gears because transmissions are typically designed to have less life in the lower gears than in the higher gears. The use of a low range can also produce torque amplification, most commonly needed in Europe where many vehicles have smaller engines to improve fuel economy but are also used to pull recreational trailers through mountainous terrain in Europe. The increase in ratio spread may also provide for reductions in numerical axle ratio of the vehicle thereby improving the fuel economy during normal highway operation.

The present invention focuses on a method of shifting the transmission of the vehicle in accordance with the invention which includes providing a transmission connected to a vehicle engine having a predetermined number of gear ratios which are selectable. A transfer case coupled to an output from the transmission and having an output from the transfer case to at least one drive wheel of the vehicle is provided. The transfer case itself includes at least two gear transfer ranges which are selectable and will expand the number of ratios available for shifting during operation of the vehicle. The expansion of the number of available gear ratios is carried out by selecting a gear ratio from the transfer case which provides a final drive ratio either above or below the selected gear ratio of the transmission during operation of the vehicle. The invention also incorporates what is generally known as a dog clutch that functions to disengage the planetary gear set of the transfer case and engage the input shaft directly to provide a direct 1:1 drive ratio.

The invention can also include a transfer case with the low range gear set modified to produce a 1.6:1 reduction versus a 2.64:1. This may be achieved by having the ring gear be the input and holding the sun gear.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a full, sectional view of a portion of a synchronizer according to the present invention taken along line 5-5 of FIG. 4a.

DETAILED DESCRIPTION OF THE PREFERRED EMBODIMENTS

The following description of the preferred embodiment(s) is merely exemplary in nature and is in no way intended to limit the invention, its application, or uses.

Figure 1:
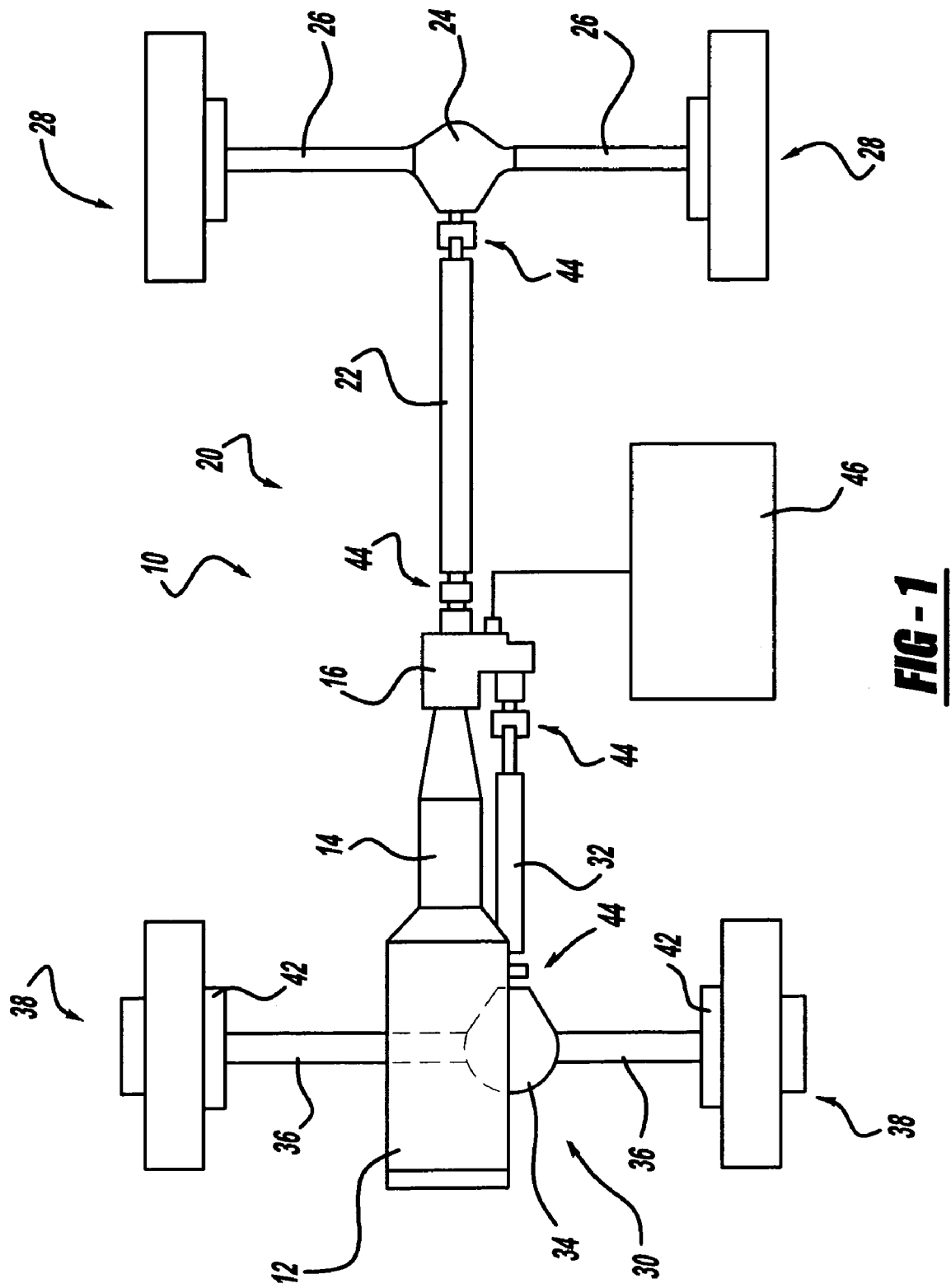
FIG. 1 is a diagrammatic view of a motor vehicle driveline having a transfer case incorporating the present invention.
Figure 2:
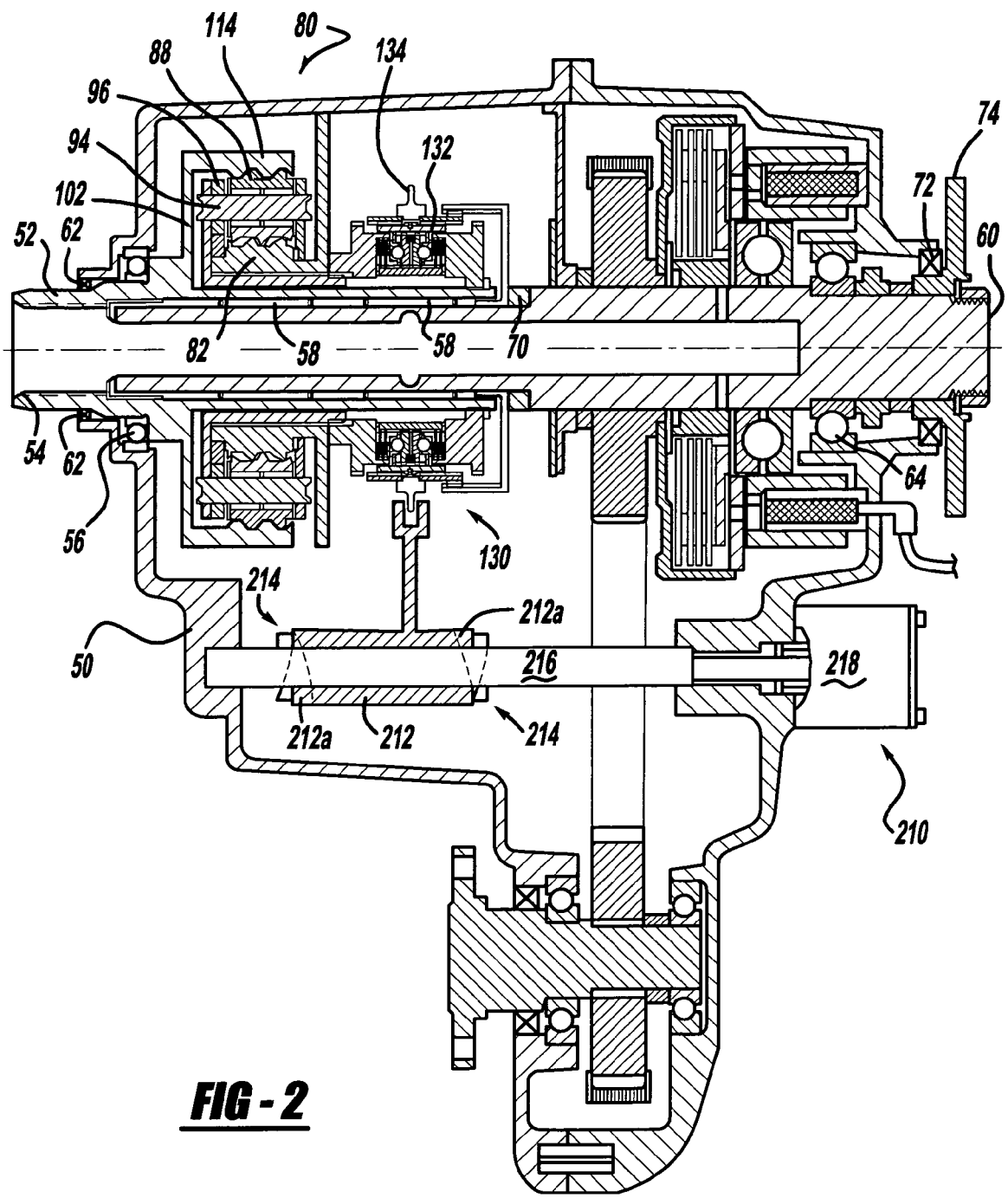
FIG. 2 is a full, sectional view of a motor vehicle transfer case incorporating a synchronizer according to the present invention.

Referring now to FIG. 1, a four-wheel vehicle drive train is diagrammatically illustrated and designated by the reference number 10. The four-wheel vehicle drive train 10 includes a prime mover 12 which is coupled to and directly drives a transmission 14. The transmission 14 may either be an automatic or manual type. The output of the transmission 14 directly drives a transfer case assembly 16 which provides motive power to a primary or rear drive line 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front drive line 30 comprising a secondary or front prop shaft 32, a secondary or front differential assembly 34, a pair of live secondary or front axles 36 and a respective pair of secondary or front tire and wheel assemblies 38. The front tire and wheel assemblies 38 may be directly coupled to a respective one of the pair of front axles 36 or, if desired, a pair of manually or remotely activateable locking hubs 42 may be operably disposed between the pair of front axles 36 and a respective one of the tire and wheel assemblies 38 to selectively connect same. Finally, both the primary drive line 20 and the secondary drive line 30 may include suitable and appropriately disposed universal joints 44 which function in conventional fashion to allow static and dynamic offsets and misalignments between the various shafts and components. An electronic control unit 46 controls the shifting of the transfer case in order synchronizes it with the transmission 14.

The foregoing and following description relates to a vehicle wherein the rear drive line 20 functions as the primary drive line, i.e., it is engaged and operates substantially all the time and, correspondingly, the front drive line 30 functions as the secondary drive line, i.e., it is engaged and operates only part-time or in a secondary or supplemental fashion, such a vehicle commonly being referred to as a rear wheel drive vehicle.

These designations "primary" and "secondary" are utilized herein rather than "front" and "rear" inasmuch as the may be readily utilized in transmissions and transfer cases wherein the primary drive line 20 is disposed at the front of the vehicle and the secondary drive line 30 is disposed at the rear of the vehicle. Such designations "primary" and "secondary" thus broadly and properly characterize the function of the individual drive lines rather than their specific locations.

Referring now to FIGS. 2-7, the transfer case assembly 16 incorporating the present invention includes a multiple piece, typically cast, metal housing assembly 50 having planar and circular sealing surfaces, openings for shafts and bearings and various recesses, shoulders, flanges, counterbores and the like to receive various components and assemblies of the transfer case assembly 16. An input shaft 52 includes female or internal splines or gear teeth 54 or other suitable structure which drivingly couple an output of the transmission 14 (illustrated in FIG. 1) to the input shaft 52. The input shaft 52 is rotatably supported externally by anti-friction bearings such as a ball bearing assemblies 56 and internally by an anti-friction bearing such as a roller bearing assemblies 58. The roller bearing assemblies 58 are disposed upon a reduced diameter portion of a primary output shaft 60. An oil seal 62, positioned between the input shaft 52 and the housing assembly 50, provides an appropriate fluid tight seal therebetween.

The transfer case assembly 16 includes a planetary gear speed reduction assembly 80. The planetary gear speed reduction assembly 80 includes a ring gear 114 that is integrated to the input shaft 52 by a circular disc 102. The ring gear 114 serves as the input to the planetary gear speed reduction assembly 80. The ring gear 114 has teeth 112 that engage a plurality of planet gears 88. The planet gears 88 are rotatably disposed upon roller bearings 92 which in turn are supported by fixed stub shafts 94 or the planet gears 88 can be rotatably supported directly on the stub shafts 94, if desired. The stub shafts 94 are retained and secured within a planet carrier 96 that includes an extension 98, second extension 99 and male or external splines or gear teeth 100.

The planet gears 88 are in constant mesh with gear teeth 86 of a sun gear 82 which is held stationary by an extension 87.

The input shaft 52 includes an elongate sleeve or quill 122. The sleeve or quill 122 is rotatably supported by a pair of roller bearing assemblies 58. The sleeve or quill 122 of the input shaft 52 includes extension 123 having male splines or gear teeth 126 which are spaced from and axially aligned with the male splines or gear teeth 100 on the second extension 99.

Figure 3:
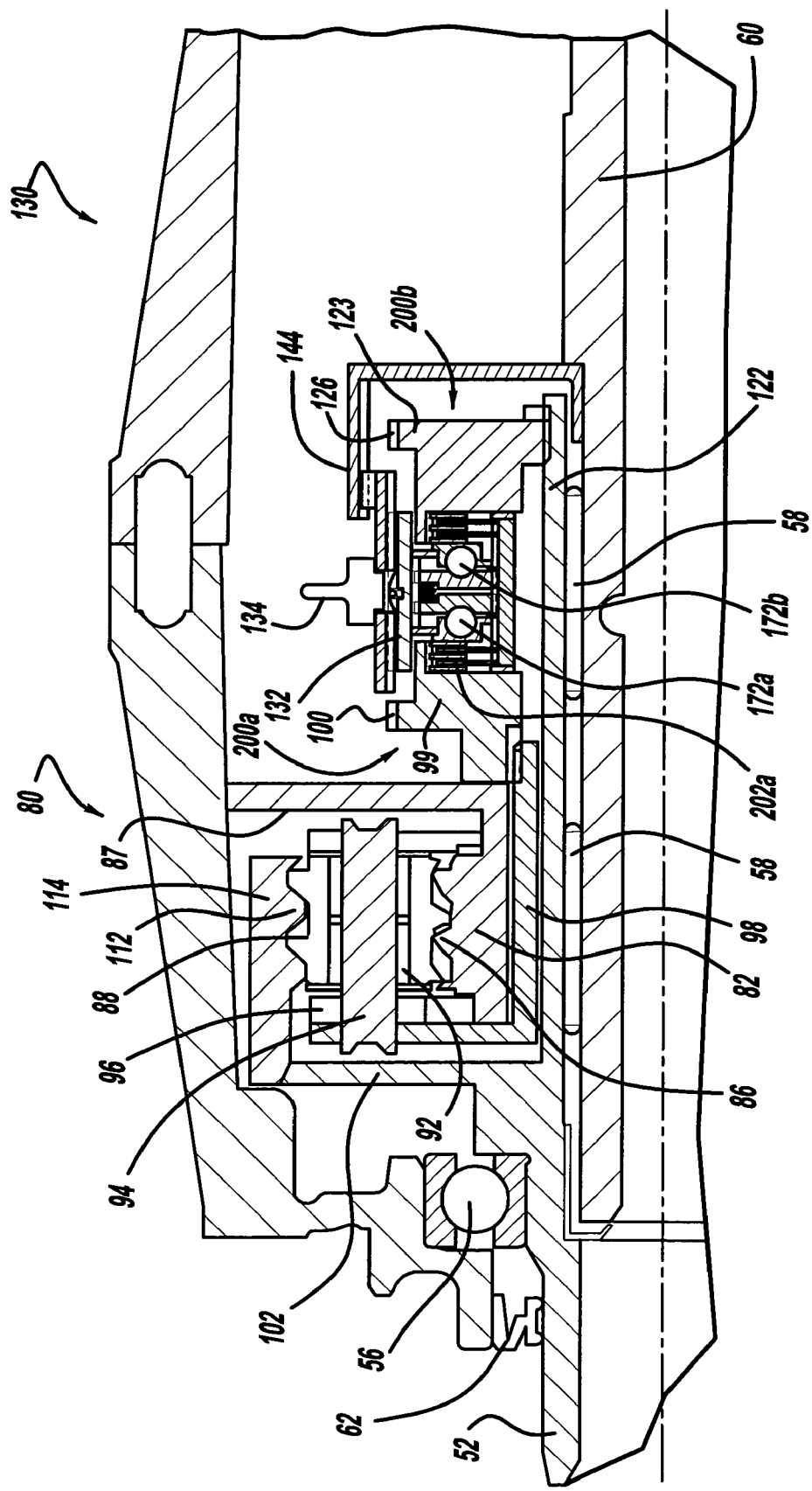
FIG. 3 is an enlarged, fragmentary, sectional view of the synchronizer according to the present invention.
Figure 4A:
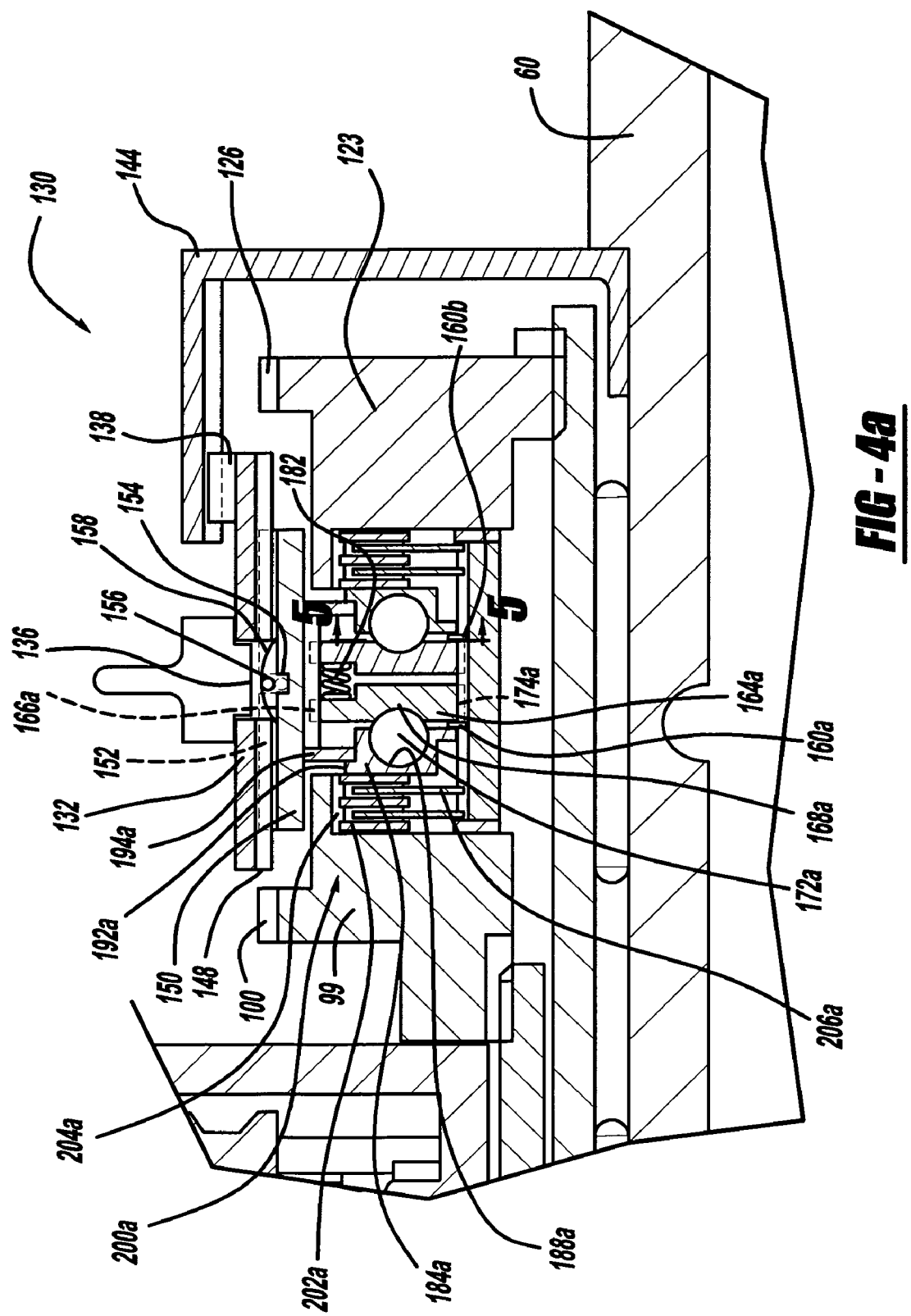
FIG. 4a is a greatly enlarged, fragmentary, sectional view of the synchronizer assembly according to the present invention.
Figure 4B:
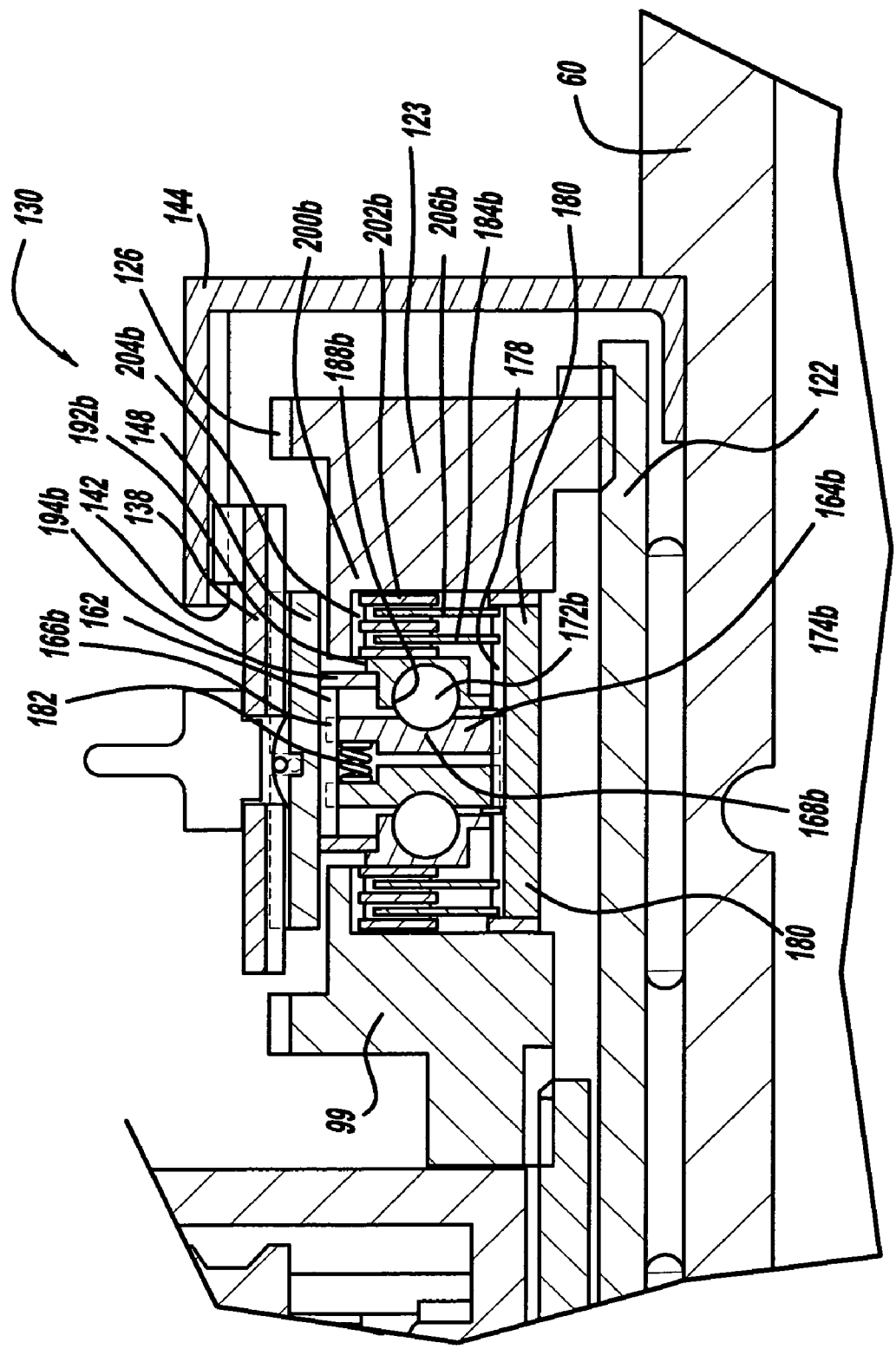
FIG. 4b is a second greatly enlarged, fragmentary, sectional view of the synchronizer assembly according to the present invention.

The transfer case assembly 16 also includes a synchronizer assembly 130 as best seen in FIGS. 3, 4a, and 4b. The synchronizer assembly 130 includes an outer annular shift collar 132 that is bi-directionally translated from its center position by corresponding bi-directional motion of a shift fork 134 which is received within a circumferential channel or groove 136. The annular shift collar 132 includes external or male splines or gear teeth 138 that are complementary to and in constant engagement with female or internal splines or gear teeth 142 formed on an annular member 144 of the primary output shaft 60. The annular shift collar 132 also includes internal or female splines or gear teeth 148 which are complementary to and axially aligned with the male splines 100 on the planetary gear carrier 96 and the male splines 126 of the extension 123 on input shaft sleeve or quill 122. There is also an inner detented collar 150 which has external or male splines or gear teeth 152 received within and rotates with the annular shift collar 132. The detented collar 150 includes a circumferential channel 154 which is capable of receiving a contractable circumferential spring 156 which, in its relaxed state, resides within a shallow, oblique-walled circumferential recess 158 in the outer annular shift collar 132. The circumferential groove 154, the contractable spring 156 and the oblique-walled circumferential recess 158 cooperate to provide a detenting action between the detented collar 150 and the annular shift collar 132 which provides some resistance to motion of the detented collar 150, when the detented collar 150 is moved out to the position illustrated in FIG. 3. The shift fork 134 is connected to annular shift collar 132, but allows annular shift collar 132 to rotate with inner right and left circular ball ramp members 164a and 164b. As the shift fork 134 is translated to the left or to the right in FIG. 2 or 3, the annular shift collar 132 is also translated to the left or to the right.

Referring now to FIGS. 3, 4a, 4b, and 6, centrally disposed on the inner surface of the annular shift collar 132 is a region of axially extending internal or female splines or gear teeth 162. The splines or gear teeth 162 engage first or inner left and right circular ball ramp members 164a and 164b which include splines 166a and 166b complementary to and engaged with the female splines or gear teeth 162 on the detented collar 150. The circular members 164a and 164b include a plurality of oblique walled, ramped recesses 168a and 168b which receive a like plurality of load transferring balls 172a and 172b. Preferably, the ramped recesses 168a and 168b extend angularly over approximately 90° to 100°. The circular members 164a and 164b also include internal or female splines or gear teeth 174a and 174b that engage complementarily configured male or external splines or gear teeth 178 on a collar or hub 180 that is freely rotatably disposed upon the input shaft sleeve or quill 122. The splines or gear teeth 178 are non-standard in that only three splines or gear teeth 178 disposed at 120° intervals reside on the collar or hub 180. It will be appreciated that the primary output shaft 60, the annular shift collar 132, the detented collar 150, annular member 144, the first or inner clutch members 164a and 164b and the collar or hub 180 all rotate together.

Operably disposed between the adjacent faces of the first or inner left and right circular ball ramp members 164a and 164b is a compression spring 182. The compression spring 182 may be a Belleville washer, a wave washer, or a circular disc having a plurality of small compression springs disposed along axes parallel to and equidistant from the center line of the primary output shaft 60.

Figure 6:
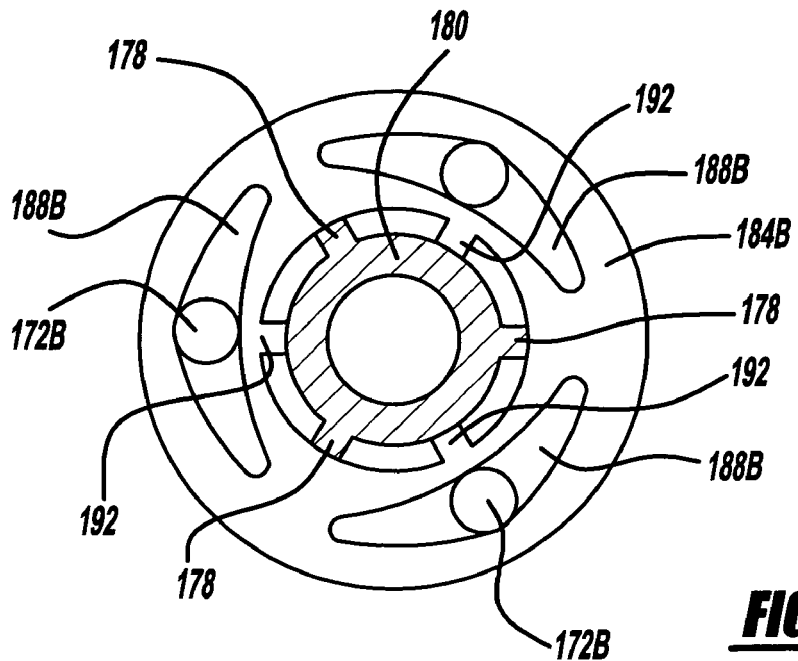

The synchronizer assembly 130 includes second or outer left and right circular ball ramp members 184a and 184b each having a corresponding plurality of oblique walled, ramped recesses 188a and 188b. Preferably, the ramped recesses 188a and 188b extend angularly over approximately 90 to 100°. As illustrated in FIG. 6, the three male or external splines 178 spaced at 120° intervals engage with a corresponding number, i.e., three, spaced apart splines 192 on each second circular member 184b. The second circular member 184b is free to rotate through a limited range of travel relative to the collar or hub 180. Such range of travel is on the order of eighty to ninety angular degrees and thus the relative rotation and the axial displacement of the circular members 164a and 164b relative to the corresponding circular member 184a and 184b is limited.

Figure 7:
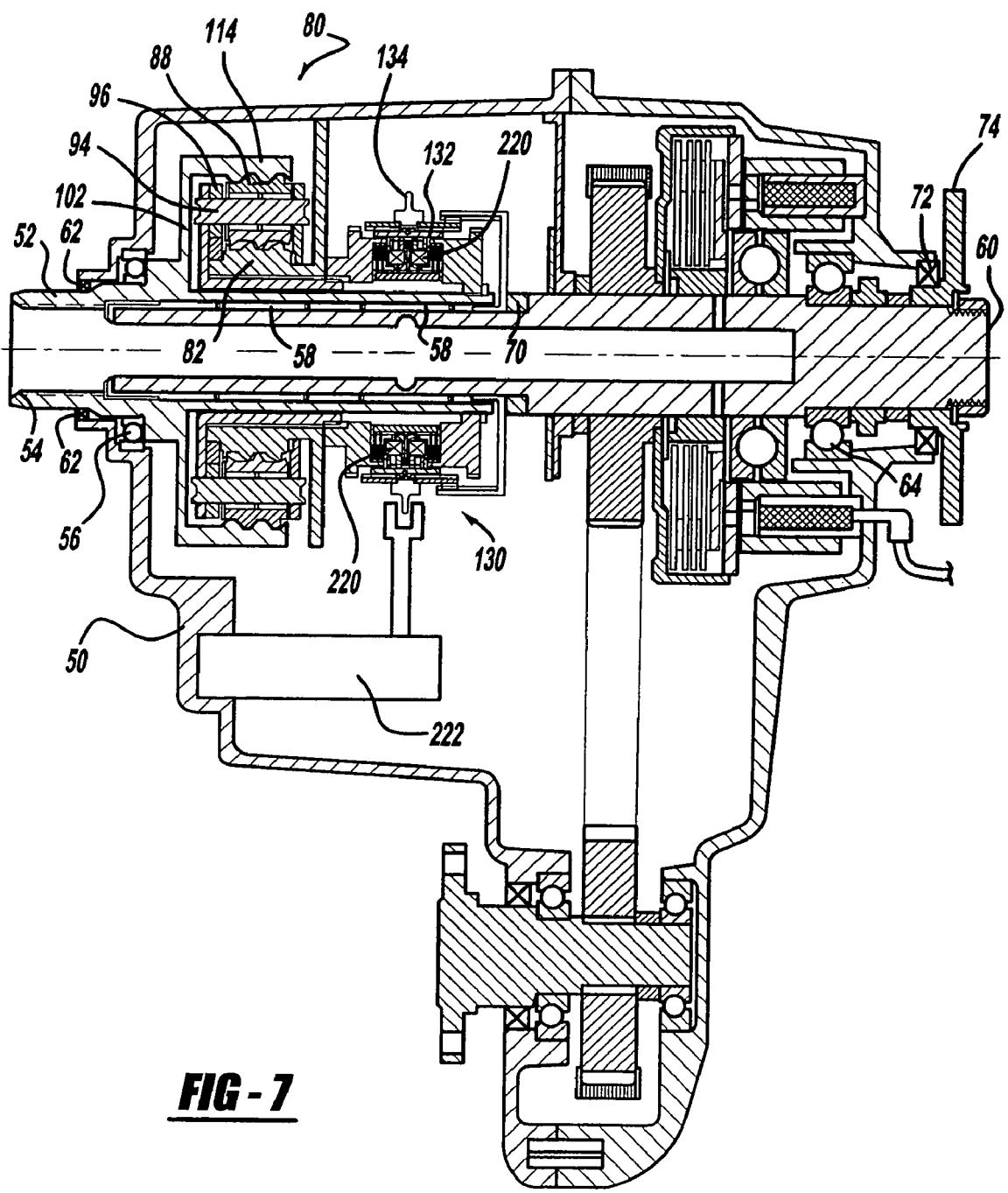
FIG. 7 is a full, sectional view of a motor vehicle transfer case incorporating a synchronizer which is hydraulically actuated, according to the present invention.

It will be appreciated that the ramped recesses 168a, 168b, 188a, and 188b and the load transferring balls 172a and 172b could be replaced with other analogous mechanical elements that cause axial displacement of the circular members 164a, 164b, 184a and 184b in response to relative rotation therebetween. For example, tapered rollers disposed in complementarily configured conical helical surfaces may be utilized. An example of this alternate embodiment is shown schematically in FIG. 7, generally at 220. The tapered rollers act to replace the load transferring balls 172a and 172b, and the conical helical surfaces can act to replace the ramped recesses 188a and 188b of the circular members 184a and 184b, respectively. It will be appreciated that the synchronizer assembly 130 may be replaced by other suitable mechanical synchronizers or a hydraulic clutch synchronizer, which can be used to engage either the 1:1 gear ratio or the reduced gear ratio. While FIG. 7 shows the hydraulic clutch actuator 222 with the tapered rollers and conical helical surfaces 220, it is within the scope of the invention that the hydraulic clutch actuator 222 could be used to actuate the synchronizer assembly 130.

Each of the second or circular outer members 184a and 184b includes a respective shoulder 192a and 192b which traps and engages a corresponding flat washer 194a and 194b. The opposite faces of each of the flat washers 194a and 194b engage the internal splines or gear teeth 162 on the detented collar 150. Thus, as the annular shift collar 132 moves to the left or right from the position as illustrated in FIG. 3, the female or internal splines or gear teeth 162 engage and translate one of the flat washers 194a or 194b in a direction corresponding to the direction of travel of the detented collar 150 and correspondingly translate one of the second or outer circular members 184a or 184b into engagement with a corresponding left and right friction clutch pack 200a or 200b.

The left and right friction clutch packs 200a and 200b include a first plurality of larger clutch plates or discs 202a and 202b. The larger friction plates or discs 202a on the left engage complementarily configured splines or gear teeth 204a on the bell shaped portion 98 of the planet carrier 96. A second plurality of smaller diameter friction clutch plates or discs 206a on the left engage the splines 178 on the collar or hub 180. Correspondingly, a first set of larger friction clutch plates or discs 202b on the right engage a complementary plurality of internal or female splines or gear teeth 204b on the elongate quill or sleeve 122 of the input shaft 52. A second, interleaved plurality of smaller diameter friction clutch plates or discs 206b on the right also engage the splines 178 on the collar or hub 180.

Figure 5:
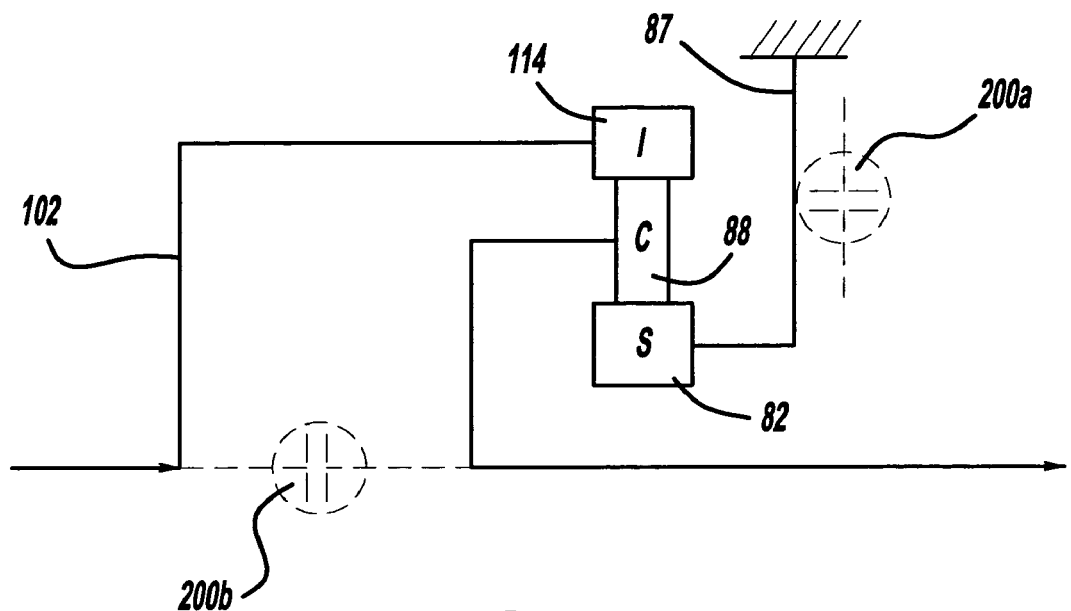
FIG. 5 is a schematic diagram of each of the power flow paths according to the present invention.

Referring to FIG. 5, a schematic layout is shown of both of the synchronizer clutch assemblies 200a and 200b. It can be seen how when clutch 200a is engaged, the sun gear 82 is held stationary; this creates the reduced gear ratio. When this occurs, clutch 200b is not engaged. When it is desired to have the gearset operate at a 1:1 ratio, clutch 200b is engaged, and clutch 200a is released.

Referring again to FIG. 2, the shift fork 134 is part of a shift operator assembly 210. The shift fork 134 extends radially from a cylindrical body 212 having a pair of identical cams 212a at each end. The cams 212a are engaged by a pair of spaced apart cam followers 214 which are secured to a bi-directionally rotatable shift shaft or rail 216. The shift rail 216 is bi-directionally rotated by an electric motor drive mechanism 218 which selectively, bi-directionally rotates the shift rail 216 and axially translates the shift fork 134 to axially, bi-directionally, move the outer elongate shift collar 132.

When a shift is commanded, the shift fork 134 begins to move the outer annular shift collar 132 to the right or to the left from the position illustrated in FIGS. 2, 3, 4a, and 4b. In the following explanation, it will be assumed that the outer annular shift collar 132 is being moved to the left as illustrated in FIGS. 2, 3, 4a, and 4b to engage the reduced speed output from the carrier 96 of the planetary gear speed reduction assembly 80. Translation of the outer annular shift collar 132 to the right engages direct drive from the input shaft 52 but the action of the synchronizer assembly 130 is essentially the same.

As the outer annular shift collar 132 moves to the left, the contractable spring 156 is driven by the oblique sidewalls 158 into the circumferential channel 154 of the inner detented collar 150. The detented collar 150 likewise begins to move to the left and the female or internal splines or gear teeth 162 translate the flat washer 194a which in turn, translates the second or outer left circular ball ramp member 184a into increased frictional engagement with the left friction clutch pack 200a. The drag so created causes relative rotation between the outer circular ball ramp member 184a and the inner circular ball ramp member 164a causing the load transferring balls 172a to axially separate the circular members 164a and 184a.

Both the relative rotation of the inner and outer circular members 164a and 184a and thus their axial separation is limited by the cooperative action of the splines 178 and 192. The axial separation of the inner and outer circular members 164a and 184a compresses the friction clutch pack 200a and begins to drive the planetary gear carrier 96 into synchronism with the primary output shaft 60. The compressive force applied to the friction clutch pack assembly 200a is controlled and limited by the compressive force generated by the compression spring 182 and, in fact, can be no greater than that force generated by the compression spring 182. There are two snap rings 160a and 160b which inhibit circular ball ramp members 164a and 164b from translating to the left or right, limiting the amount compression spring 182 can be compressed. It must be appreciated that the adjacent first or inner circular members 164a and 164b must not be permitted to touch or contact one another as this would allow force in excess of that controlled or limited by the compression spring 182 to be applied to the friction clutch packs 200a and 200b and provide abrupt and unacceptable synchronizer operation.

In this regard, it should also be appreciated that selection of the spring rate of the compression spring 182 will control the force applied to the friction clutch packs 200a and 200b and thus the relative speed of synchronization achieved by the synchronizer assembly 130. That is, a higher or stiffer spring rate will allow more force to be applied to the friction clutch packs 200a and 200b resulting in faster synchronization and a lower or softer spring rate will achieve a slower rate of synchronization.

When the speed of the planer carrier 96 matches that of a primary output shaft 60, the outer annular shift collar 132 may be further advanced to the left such that the female or internal splines or gear teeth 148 may be engaged with the male splines or gear teeth 100 second extension 99. In this condition, drive torque is transferred directly from the planetary gear carrier 96, through extension 98, through second extension 99, through the outer annular shift collar 132, through the inter-engaging splines 138 and 142, through the annular member 144, and to the primary output shaft 60.

The present invention provides a method of shifting the transmission 14 of the vehicle using the vehicle drive train 10. The method includes providing the transmission 14 which is connected to an engine of the vehicle. The transmission 14 has a predetermined number of gear ratios which are selectable. Additionally, the transfer case 16 is provided that receives an input from the transmission 14. The transfer case 16 has an output that connected to the primary or secondary wheel assemblies 28, 38. The transfer case 16 includes several gear transfer ranges that are selectable. These selectable gear transfer ranges expand the number of gear ratios available for shifting during the operation of the vehicle by selecting a gear ratio from the transfer case 16 which provides a final drive ratio either at or below at least one of said number of gear ratios of said transmission of the vehicle. The gear transfer ranges which are selected during acceleration of the vehicle will provide an additional shiftable gear range to the transmission. It is possible to have an even greater number of gear transfer ranges within the transfer case 16. The actual gear ratios achieved will vary depending on the desired ratios. Generally it will be desirable to provide a ratio of less than 1:1 in order to achieve a gear range that is intermediate to the gear range inputted to the transfer case from the transmission. The present invention is configured to provide a ratio of 1.61:1 when the planetary gear speed reduction assembly 80 is engaged.

A controller 46 is used to select the proper combination of gear ratios from the transmission or transmissions combined with the transfer case during operation of the vehicle. In the embodiment described above the controller 46 sends a control signal to an electrical actuator that actuates the torque synchronizer clutch 130 in order to shift between gear ratios.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of coordination of transfer case shifting operations with a transmission output:
   providing a transmission connected to a vehicle engine having a predetermined number of gear ratios which are selectable;
   providing a transfer case with an input from said transmission and an output to at least one drive wheel of a vehicle;
   providing said transfer case with a sun gear grounded to the inside of said transfer case, a ring gear connected to an input shaft, a set of planetary gears in mesh with said ring gear and in mesh with said sun gear, said planetary gears mounted on a carrier, an extension connected to said input shaft, and a shift synchronizer connected to said carrier on a first end and connected to said extension of said input shaft on a second end;
   said transfer case including at least two gear transfer ranges which are selectable;
   expanding the number of ratios available for shifting during operation of said vehicle by selecting a gear ratio from said transfer case which provides a final drive ratio above at least one of said number of gear ratios of said transmission during operation of said vehicle in the absence of driver input; and
   shifting said transfer case to one of said at least two gear transfer ranges.

2. The method of claim 1 wherein said step of shifting to one of said at least two gear transfer ranges is accomplished using a said shift synchronizer that allows automatic shifting between one of said at least two gear transfer ranges.

3. The method of claim 2 wherein said step of shifting said shift synchronizer is accomplished hydraulically.

4. The method of claim 1 wherein one of said at least two gear transfer ranges are selected during acceleration of the vehicle for providing at least one additional shiftable gear range to said transmission.

5. The method of claim 1 wherein the ratio of said transfer case has a ratio of less than 1:1.

6. The method of claim 1 wherein the ratio of said transfer case is greater than 1:1.

7. The method of claim 1 further comprising:
   providing a controller for selecting one of said predetermined number of gear ratios selected from the transmission or transmission combined with the transfer case during operating conditions of the vehicle.

8. The method of claim 7, wherein a torque synchronizer clutch is used for shifting under power of the transfer case.

9. The method of claim 8 wherein an electrical actuator actuates said torque synchronizer clutch.

10. The method of claim 8 wherein said torque synchronizer clutch is used for engaging of the transfer case under power.

11. The method of claim 10, further comprising a transfer clutch, wherein said controller controls operations of said torque synchronizer clutch and said transfer clutch.

12. An apparatus for automatic shifting of gears in a vehicle comprising:
   an automatic transmission having at least one selectable gear ratio;
   a transfer case operatively coupled with said transmission, including at least one gear ratio less than or greater than 1:1 and operatively coupled to a drive wheel of said vehicle;
   providing said transfer case with a sun gear grounded to the inside of said transfer case, a ring gear connected to an input shaft, a set of planetary gears in mesh with said ring gear and in mesh with said sun gear, said planetary gears mounted on a carrier, an extension connected to said input shaft, and a shift synchronizer connected to said carrier on a first end and connected to said extension of said input shaft on a second end; and said transfer case being automatically shiftable without driver input so that a final drive ratio is provided that is in combination with said transmission while the vehicle is moving.

13. The apparatus of claim 12 wherein said transmission has a plurality of gear ranges, each of said plurality of gear ranges having a gear ratio.

14. The apparatus of claim 13 wherein said transfer case lowers the gear ratio of each of said plurality of gear ranges.

15. The apparatus of claim 13 wherein said transfer case increases the gear ratio of each of said plurality of gear ranges.

16. The apparatus of claim 13 further comprising a controller for controlling engaging of the transfer case in combination with shifting of the transmission during operation of the vehicle.

17. The apparatus of claim 16 wherein said shift synchronizer engages the transfer case on the fly, said controller controlling engaging of the transfer case.

18. The apparatus of claim 17, wherein said shift synchronizer is hydraulically actuated.

19. A device for automatically providing an increased number of gear ratios in a motor vehicle in the absence of driver input, comprising:

a transmission having one or more gear ratios and an output shaft;

a transfer case coupled to said output shaft of said transmission, and coupled to a set of drive wheels in said vehicle, wherein said transfer case has a sun gear grounded to the inside of said transfer case, an input shaft connected to a ring gear in a first direction and an extension in a second direction, a set of planetary gears in mesh with said ring gear, and in mesh with said sun gear, with said planetary gears mounted on a carrier, a shift synchronizer connected to said carrier on a first end, and connected to said extension of said input shaft on a second end, a controller for controlling said shift synchronizer; and said transfer case having an output shaft connected to said synchronizer and coupled to said set of drive wheels of said vehicle, wherein said transfer case provides a 1:1 gear ratio, and a reduced gear ratio.

20. The device for providing an increased number of gear ratios of claim 19, wherein said reduced gear ratio is comprised of transferring power from said input shaft to said ring gear, through said planetary gears, through said carrier, to said shift synchronizer, and to said output shaft of said transfer case.

21. The device for providing an increased number of gear ratios of claim 19, wherein said 1:1 gear ratio is comprised of transferring power from said input shaft, to said extension, through said synchronizer, and to said output shaft of said transfer case.

22. The device for providing an increased number of gear ratios of claim 19, wherein said controller selectively engages said shift synchronizer.

23. The device for providing an increased number of gear ratios of claim 19, wherein said shift synchronizer is two ball ramp assemblies, each working in conjunction with a clutch pack.

24. The device for providing an increased number of gear ratios of claim 19, wherein said shift synchronizer is a series of tapered rollers used in conjunction with conical helical surfaces, and two clutch pack assemblies.

25. The device for providing an increased number of gear ratios of claim 19, wherein said gear ratios of said transfer case operates in concurrence with all of said gear ratios of said transmission.

26. The device for providing an increased number of gear ratios of claim 19, wherein said shift synchronizer operates under rotational force received from said transmission.

27. The device of claim 19 wherein said shift synchronizer is hydraulically actuated.

* * * * *